United States Patent [19]

Wegner

[11] Patent Number: 4,526,906
[45] Date of Patent: Jul. 2, 1985

[54] NON-BURNING, NON-DRIPPING INSTANT SET MICROCELLULAR POLYURETHANES

[75] Inventor: Gunter H. Wegner, Charlotte, N.C.

[73] Assignee: Wegner Development Company, Phoenix, Ariz.

[21] Appl. No.: 529,844

[22] Filed: Sep. 6, 1983

[51] Int. Cl.$^3$ .................. C08G 18/14; C08G 18/48
[52] U.S. Cl. ............................. 521/107; 521/108; 521/122; 521/159; 260/DIG. 33; 260/DIG. 24; 528/55
[58] Field of Search ............. 521/122, 107, 108, 159; 528/55; 260/DIG. 33, DIG. 24

[56] References Cited

U.S. PATENT DOCUMENTS

| | | | |
|---|---|---|---|
| 3,227,666 | 1/1966 | Showalter | 521/122 |
| 3,726,827 | 4/1973 | Jones et al. | 524/772 |
| 3,751,392 | 8/1973 | Olstowski | 521/122 |
| 3,755,222 | 8/1973 | Gruber et al. | 528/55 |
| 3,882,071 | 5/1975 | Olstowski et al. | 528/44 |
| 3,882,072 | 5/1975 | Olstowski et al. | 528/44 |
| 3,883,465 | 5/1975 | Olstowski | 528/44 |
| 3,929,688 | 12/1975 | Honig | 521/122 |
| 4,029,593 | 6/1977 | Schaepel et al. | 521/122 |
| 4,066,394 | 1/1978 | Leonard | 521/122 |
| 4,123,587 | 10/1978 | Wesch et al. | 523/201 |
| 4,194,068 | 3/1980 | Miller et al. | 521/107 |
| 4,196,268 | 4/1980 | Brown et al. | 521/107 |
| 4,246,360 | 1/1981 | Brown et al. | 521/107 |
| 4,275,171 | 6/1981 | Wegner | 521/108 |
| 4,363,882 | 12/1982 | Wegner | 521/171 |
| 4,397,983 | 8/1983 | Hill et al. | 521/122 |

Primary Examiner—Herbert S. Cockeram

[57] ABSTRACT

Non-burning, non-dripping instant set microcellular polyurethanes involving an isocyanate-terminated reaction product of polyisocyanate with low molecular weight polyether polyol or polyol blends in the presence of other ingredients such as inert liquids with boiling points above about 150° Celsius and accelerating agents for urethane formation. Specifically, this invention provides an improved mode for flame retarding polyurethane compositions by incorporating a mixture of dibromoneopentyl glycol (DBNG) or its esters and a non-reactive flame retardant plasticizer when dissolved or dispersed into the urethane polymer. Molecular sieves are included, which enhance char formation. The compositions have applications with stringent fire retardancy standards, such as electrical insulators, industrial housings, annular spacers, decorative objects, furniture or furniture components, gear and machine components, agricultural components and other related areas.

18 Claims, No Drawings

NON-BURNING, NON-DRIPPING INSTANT SET MICROCELLULAR POLYURETHANES

BACKGROUND OF THE INVENTION

This invention relates to solid instant set microcellular polyurethanes, and more particularly to such polyurethanes having flame retardant properties. Polyurethanes which are flame retardant are desired, and in some cases required, for many applications, especially as legislation increases in requiring high flame retardancy standards. Fire retardancy of polyurethanes is accomplished by either incorporating the flame retardant into the reaction medium as a separate stream or preblending it with the other reactants. There are basically two practical methods of incorporating fire retardants in polyurethane compositions, namely the additive and the reactive methods. In the additive method, it is well known to add phosphorus containing nonreactive plasticizer compounds to improve flame retardant properties. Examples of such products include ANTIBLAZE 19, a cyclic phosphonate ester, disclosed in Mobil Chemical Company U.S. Pat. Nos. 3,789,091 and 3,849,368. ANTIBLAZE 78, a chlorinated phosphonate ester, and ANTIBLAZE 80, a chlorinated phosphate ester, are other useful flame retardants sold by Mobil Chemical Company. THERMOLIN 101 sold by Olin Chemical Company and FYROL 2xC20 sold by Stauffer Chemical Company are additional use chlorinated phosphate ester flame retardants. The latter product is described in Monsanto Company U.S. Pat. No. 3,192,242. It is also known to use solid additives to achieve fire retardancy in polyurethanes, such as by adding a dispersion grade polyvinyl chloride, antimony trioxide and zinc oxide to the reactants, which is described in U.S. Pat. No. 3,574,149. Also, alumina trihydrate is a conventional inert filler used to achieve fire retardancy in urethanes. These approaches have proven to be inefficient due to the incompatibility of the solid additives with the polyurethane system.

A disadvantage of flame retardant polyurethane compositions using additive type flame retardants is the phenomenon of dripping of the melted polyurethane polymer while it is burning during and shortly after ignition. The flaming droplets may spread the flame beyond the site of initial ignition. Indeed, in some compositions, the formulation would be self-extinguishing except for the fact that the dripping away of the melted polymer constantly exposes a fresh new surface of polymer to the fire.

In the reactive method, it is known to use polybrominated polyols to impart flame retardancy to the polyurethane chains when copolymerized with the other reactants which form the urethane linkage. The most efficient of the reactive flame retardants is dibromoneopentyl glycol (DBNG), which reacts with a polyisocyanate to form a diurethane and has the potential of ring closure upon evolution of HBr. Incorporating the dibromoneopentyl glycol in the reaction medium so that it can be polymerized with the other reactants proves to be a problem in commercial-scale operations, since pure DBNG is a solid having a melting point of 110° C. A commercially available dibromoneopentyl glycol is FR 1138, sold by Dow Chemical Company, which consists primarily of 85% dibromoneopentyl glycol, 10% tribromoneopentyl alcohol and 5% monobromoneopentyl triol and has a melting range of 90°–100° C. Although dibromoneopentyl glycol has been recognized as an excellent flame retardant for unsaturated polyester resins for many years, the product had only limited success in polyurethane applications due to the problems associated with handling and processing this material.

The process involved in burning of a polymer are heating, decomposition, ignition, combustion and propagation. Flameretarding mechanisms interrupt the occurrence of one or more of these processes and are provided by certain elements such as halogens (specifically chlorine and bromine), phosphorus, antimony, boron and arsenic. Halogenated compounds can generate species that interfere with free-radical reactions in the gas phase, thereby hindering combustion. Flame retardants containing halogens are thought to function in the vapor phase as either a diluent and heat sink or as a free radical trap that stops or slows flame propagation. Volatile components are generated from halogenated compounds, and these compounds react with radicals in the gas-phase combustion process. Because HCl and HBr constantly volatilize from the surface, less oxygen diffuses to the surface to react in the thermo-oxidative process; the result is exclusion of oxygen at the substrate surface, elimination of hydrogen halides, and char promotion. Organophosphorus compounds function in the solid phase by forming a char over the substrate, reducing flammability of the polymer by preventing heat and mass transfer necessary for combustion. Phosphorus content is not the only criterion for performance as flame retardant; the ester structure is also important. However, the char forming mechanism has been generally found inefficient by using phosphate ester plasticizers in microcellular polyurethane compositions for passing testing criteria classed V-0 according to the Underwriters' Laboratories 94 Standard Test for Flammability of Plastic Materials for Parts in Devices and Appliances, Jan. 24, 1980, pages 7010, Section 3: Vertical Burn Test for Classifying Material 94 V-0, 94 V-1, or 94 V-2.

Rapid-setting, non-elastomeric, solid urethane compositions have been taught in Newton U.S. Pat. No. 3,378,511, Jones et al U.S. Pat. No. 3,726,827 and Olstowski U.S. Pat. No. 4,000,105, all assigned to the Dow Chemical Company. Newton discloses a composition comprising the reaction product of a polyisocyanate with a polyether polyol in admixture with a modifying liquid ester of a carboxylic acid or its anhydrides having a boiling point above about 150° C. and an organotin compound or an amine compound to provide catalysis. The compositions do not include a flame retardant. Jones et al disclose an improvement over the prior art by presenting improved physical properties at the same or lower concentrations of the liquid modifier. The compositions comprise a liquid prepolymer such as one prepared by reacting an organic diisocyanate with a polyhydroxyl-containing compound which, in turn, is reacted with a liquid polyether polyol containing 3 to 8 hydroxyl groups in conjunction with a non-amine-containing catalyst such as stannous octoate. The compositions do not include a flame retardant. Olstowski discloses rapid-setting, non-elastomeric, solid urethane compositions without the use of a catalyst comprising an amine initiated polyether polyol such as triethanolamine, an organic aromatic polyisocyanate such as polymethylene polyphenylisocyanate and a liquid modifier compound having a boiling point above about 150° C. such as dioctylphthalate. The organic aromatic polyisocyanates can include isocyanate terminated prepolymers prepared by the reaction of amine initiated polyol with an isocyanate. Olstowski describes organophosphorus compounds with a boiling point above about 150° C. as suitable liquid modifiers but not as flame retardants. Fire retardancy properties are not inherent in these compositions.

Many different methods have been taught in the prior art for flame retarding polyurethanes by the incorporation of dibromoneopentyl glycol with and without an organophosphorus compound into the polymer matrix. Because of the reactive hydroxyl groups of DBNG it becomes permanently bound in the polyurethane polymer. Miller et al U.S. Pat. No. 4,194,068 discloses a liquid frame retardant for polyurethane compositions, which contain a mixture of a bromohydrin of pentaerithritol, like dibromoneopentyl glycol, a polyhydric alcohol, like a glycerol initiated polyether polyol with an average molecular weight of about 300, and a sufficient amount of a flame retardant organophosphorus compound to render the mixture a substantially solidsfree liquid at 25° C., one atmosphere pressure. The mixtures are suitable for cellular foams and for rigid cellular foams, which are produced in the presence of blowing agents, like fluorocarbons and/or carbon dioxide generated by the chemical reaction between water and diisocyanate. Wegner U.S. Pat. Nos. 4,275,171 and 4,363,882 disclose blends of dibromoneopentyl glycol and flame retardant plasticizers, like halogenated organophosphorus compounds, suitable to flame-retard flexible polyurethane foams in the oneshot foaming process. These blends of DBNG and phosphorus containing plasticizers in flexible foam do not result in satisfactory non-dripping or char formation characteristics.

in many plastics and polymer systems drying agents are required to prevent reaction with water and subsequent gassing during storage or viscosity buildup in storage containers. Molecular sieves are effective adsorbents made from natural or synthetic crystalline alkalimetal alumino-silicates of the zeolite type. The molecular sieve powder, sold by the Linde Division of Union Carbide Corporation, is added to two-component urethanes to the prepolymer side and/or polyol portion of the formulation prior to reaction. Water is adsorbed preferentially over all other compounds, illustrating the strong advantage of the sieve molecule in scavenging water in polyurethane systems. The water, once adsorbed within the crystalline pore system, is retained there and isolated from the resin formulation, thereby providing resin dryness. The powder is essentially inert to the other formulation components. Such molecular sieves have been known for use to provide moisture-adsorbing characteristics, and one disclosed in Wesch et al U.S. Pat. No. 4,123,587 to assist in flame retardancy, but not in a polyurethane system. Furthermore, neither Wesch et al nor any other known prior art disclose the use of molecular sieves for char forming characteristics.

SUMMARY OF THE INVENTION

By the present invention it has been discovered that the combination of an organophosphorus plasticizer and a polybrominated polyol, such as dibromoneopentyl glycol, provides unexpected flame retardancy in an instant set polymer such that the composition is non-burning and non-dripping. By the present invention it has also been discovered that molecular sieves in sufficient quantity can impart effective char formation when incorporated in an instant set polymer, preferably, but not essentially, in combination with the blend of organophosphorus plasticizer and brominated polyol. Thus, this invention is directed to microcellular polyurethane compositions that are non-burning or self-extinguishing and non-dripping. As used herein, the expression non-burning or self-extinguishing and non-dripping means capable of obtaining a V-0 rating under Underwriters' Laboratories Test Procedure for Flammability of Plastic Materials for Parts in Devices and Appliances. These microcellular polyurethanes are solid and non-elastomeric and are made from polyisocyanates or polyisocyanate prepolymers reacted with low molecular weight polyether polyols blended with a non-reactive, liquid modifier compound, such as dioctylphthalate, having a boiling point above about 150° C. with or without a catalyst for urethane formation, and a mixture of a flame retardant plasticizer and a polybrominated polyol such as dibromoneopentyl glycol (DBNG) or esters of DBNG e.g., reaction products of DBNG with adipic acid. The combination of this plasticizer and DBNG results in a synergistic system that is substantially more effective in non-burning and non-dripping characteristics than the plasticizer without DBNG.

The plasticizer is a liquid organophosphorus plasticizer such as a halogenated phosphate ester or a halogenated phosphonate ester. The weight ratio of plasticizer to DBNG is about 75/25 to 25/75 with the preferred range being 65/35 to 50/50; the preferred concentration of the blend is at least about 20% by weight based on the combined weight of reactants and liquid modifier compound. The stoichiometric proportions of polyisocyanate or polyisocyanate prepolymer to polyether polyol, i.e. the NCO/OH ratio, ranges from about 0.85 to about 1.15 NCO groups for each OH equivalent; the preferred NCO/OH ratio ranges from about 0.95 to about 1.05 NCO groups for each OH equivalent. The detailed technology to produce a polymeric urethane composition is described in U.S. Pat. Nos. 3,378,511, 3,726,827 and 4,000,105 assigned to the Dow Chemical Company and sold under the trade names ISP-100 and ISP-270, which stands for Instant Set Polymer (ISP). The ISP fabrication technology, applications and mechanical properties are described in brochures published by Freeman Chemical Company and Poly Blends, Inc. A more detailed description of chemistry and technology of urethane polymers can be found in ENCYCLOPEDIA OF CHEMICAL TECHNOLOGY, edited by Kirk-Othmer, 2d edition, volume 21, 1970, and ENCYCLOPEDIA OF POLYMER SCIENCE AND TECHNOLOGY, edited by H. F. Marks et al, volume 5, 1966.

Flame retardants based on blends of dibromoneopentyl glycol with organophosphorus plasticizers offer numerous advantages over other flame retardants. Firstly, the flame retardants are liquid solutions at temperatures ranging from about 25° C. to about 32° C. depending on the amount of DBNG in the blend make-up. Secondly, a high degree of flame retardancy is achieved at a relatively low level of flame retardant add-on without a deleterious effect on physical properties, such as tensile strength, elongation, tensile modulus and hardness properties.

As is known, an organophosphorus plasticizer when used by itself as a flame retardant in an instant set polymer does not provide satisfactory results, because when exposed to a flame or corresponding high heat it melts and drips with the composition, thereby exposing fresh new surface of polymer to the flame for ready combustion contrary to flame retardant purposes. By the present invention, it has been discovered that when such a plasticizer is blended with a reactive polybrominated polyol, namely dibromoneopentyl glycol, the dripping characteristic has been eliminated. It would normally be expected that the more plasticizer that is used, the more dripping would occur, but by the present invention it has been discovered that the polybrominated polyol apparently serves to prevent the plasticizer from dripping, thereby making it more effective and allowing it to serve its flame retardancy function. It is theorized that the polybrominated polyol somehow ties the flame retardant plasticizer to the polymer backbone by some non-chemical attraction in the polyurethane environment to provide the uniquely high flame retardant characteristics. Further, it would normally be expected that the hardness of the instant set polymer would be decreased by increasing additions of the plasticizer, but uniquely this does not happen with the flame retardant (FR) plasticizer/polybrominated polyol blend. The hydroxyl groups of the brominated polyol provide reactive sites to chain extend the molecule into the polymer, thus maintaining rigidity in the composition, and advantageously other physical properties, especially tensile strengths, are not sacrificed.

Another advantage that has been discovered by blending the organophosphorus plasticizer with a polybrominated polyol is that the expected shrinkage of the composition is negligible. It is known that a polybrominated polyol tends to cause polyurethane foam to shrink, whereas an organophosphorus plasticizer tends to open the foam. In the present invention the combination of the components can be proportioned to minimize changes in the cellular foam. Furthermore, in the microcellular polyurethane compositions in which the present invention is utilized, the small cell, high density characteristics make changes in cell size relatively insignificant in the characteristics of the composition.

A further enhancement of flame retardancy is accomplished by incorporating a minor amount of an adsorbent into the compound, namely molecular sieves, which are made from natural or synthetic crystalline alkali-metal alumino-silicates of the zeolite type. Preferably such molecular sieves are used with flame retardant plasticizer/polybrominated polyols blends in compositions as described above for best non-burning, non-dripping results, but it is also within the scope of this invention to use molecular sieves in compositions with flame retardant plasticizers but without a polybrominated polyol, which can provide improved results in comparison with the prior art, though not as effective as when used with DBNG. Preferably the concentration of the sieves is at least about 0.6% by weight of the combined weight of the reactants and liquid modifier.

Molecular sieves are used to adsorb moisture in chemical reactions, but they have not been known for use as a char former. By the present invention, it has been discovered that the molecular sieves will hold a flame retardant in place when exposed to a flame or high heat so that the flame retardant will serve its function and not run off to expose the polyurethane base for combustion.

The products of the present invention have a wide range of applicability, wherever fire retardancy is desired, and have particular application where stringent standards are imposed, such as for electrical insulators, industrial housings, annular spacers, decorative objects, furniture or furniture components, machine components, argicultural components and other related products.

DETAILED DESCRIPTION OF THE PREFERRED EMBODIMENTS

The flame retardants of the present invention can be formulated in one embodiment by heating and mildly agitating the dibromoneopentyl glycol in a liquid organophosphorus plasticizer for about 60 to about 120 minutes at a temperature of about 70° C. to about 100° C. The order of addition of DBNG to flame retardant plasticizer is not critical and may be reversed if desired. Pure dibromoneopentyl glycol or 2,2-bis-(bromomethyl)-1,3-propane diol is a solid having a melting point of 110° C.; the product is commercially available from Dow Chemical Company as FR 1138, which is a mixture of bromohydrins of pentaerithritol consisting mainly of DBNG with a melting range from 90°-100° C. The weight ratio for the plasticizer/DBNG mixture is from about 75/25 to about 25/75; the ratios of 50/50 to 65/35 are preferred. The preferred concentration of the blend is at least about 20% by weight based on the combined weight of reactants and liquid modifier compound. The stoichiometric proportions of polyisocyanate or polyisocyanate prepolymer to polyether polyol, i.e. the NCO/OH ratio, ranges from about 0.85 to about 1.15 NCO groups for each OH equivalent; the preferred NCO/OH ratio ranges from about 0.95 to about 1.05 NCO groups for each OH equivalent. Esters of DBNG, namely reaction products of DBNG with adipic acid can also be utilized; XNS-50044 is such a DBNG-adipate ester sold by Dow Chemical Company. Another useful product is XNS-50097 which is a blend consisting of about 60% brominated pentaerythritol by weight and 40% polyether polyol resins by weight sold by Dow Chemical Company.

Representative examples of the organophosphorus flame retardant plasticizer include: tris(2,3-dibromopropyl)phosphate, tris(2,3-dichloropropyl)phosphate, dimethyl methylphosphonate, tris($\beta$chloropropyl)phosphate, tris($\beta$-chloroethyl)phosphate, tetrakis(2-chloroethyl)ethylene diphosphate, triethyl phosphate, tricresylphosphate, diethyl[bis(2-hydroxyethyl)amino]methane phosphonate, diethyl methylphosphonate, diol-phosphonates as described in U.S. Pat. No. 4,102,830, mixtures thereof and the like.

The prepolymers which may be employed as components in the present invention may be prepared by methods well known to the art. Any suitable organic polyisocyanate for the prepolymer process may be derived from aromatic, aliphatic and heterocyclic polyisocyanates, for example, 2,4-toluene diisocyanate, 2,6-toluene diisocyanate, 1,5-naphthalene diisocyanate, 1,8-naphthalene diisocyanate, phenylene diisocyanate, ethylene diisocyanate, 4,4'-diphenylmethane diisocyanate, 4,4'-diphenyl diisocyanate, methylene diisocyanate, hexamethylene diisocyanate, trimethylene diisocyanate, tetramethylene-1,4-diisocyanate, 1,4-butylene diisocyanate, mixtures of one or more organic diisocyanates and the like. Polyisocyanates may also be employed in the formation of polyurethane compositions via the one-shot method, in which none of the isocyanate portion has been prereacted with any portion of the polyol prior to final mixing.

Suitable polyether polyols to be employed in making the urethane polymer compositions include, for example glycerol, trimethylol propane, pentaerithritol, 1,2,6- hexane triol, styrene-vinyl alcohol copolymer, sucrose, sorbitol and similar polyhydric materials reacted with alkylene oxides such as propylene oxide, butylene oxide, mixtures of ethylene oxide and propylene oxide and the like. Mixtures of the monomers forming the polyether polyols as well as mixtures of the polyols themselves may be used. The polyether polyols have at least 3 functional hydroxyl radicals but may have up to 8 or more functional hydroxyl radicals. Suitable polyols which may be employed to prepare the prepolymers are those polyols prepared from initiators having from 3 to 8 hydroxyl groups as mentioned above and those containing two hydroxyl groups per molecule ethylene glycol, propylene glycol, butane diol, hexane diol, dibromoneopentyl glycol, mixtures thereof and the like.

Suitable amine initiated polyols to be employed in making the urethane polymer compositions are reaction products of an amine with an alkylene oxide having from 3 to about 8 active hydrogen atoms. Amine initiators include aromatic and aliphatic amines, such as ammonia, ethylene diamine, diethylene triamine, triethylene tetraamine, toluene diamine, mixtures thereof and the like.

Suitable liquid esters of a carboxylic acid having a boiling point above about 150° C. may be employed as modifiers in the microcellular compositions, including those esters prepared from mono- and polycarboxylic acids having from about 1 to about 20 carbon atoms such as for example phthalic acid, adipic acid, acetoacetic acid, formic acid, acetic acid, and the like, and wherein the ester portion contains from about 1 to about 20 carbon atoms such as methyl, ethyl, propyl, butyl, and the like. Other liquid modifier compounds with a boiling point above about 150° C. can be employed and include a group consisting of hydroxyl-containing and non-hydroxyl-containing polyoxyalkylene compounds, organic phosphates, organic phosphites, organic phosphonates, cyclic ethers, aromatic compounds, partially hydrogenated aromatic compounds, organic carbonates, chlorinated aliphatic compounds, cyclic sulfones, esters of carboxilic acids and mixtures thereof.

A catalyst used for urethane formation may be optionally employed. The catalyst can be an organotin compound such as stannous octoate, stannous laurate, dibutyltindilaurate or an amine compound such as triethylene diamine, bis-(dimethylaminoethyl)ether, dimethylethanolamine and the like. Liquid catalysts are preferred over non-liquid catalysts.

Other fillers and reinforcements may be added to the formulation without distracting from the scope thereof. This includes, for example, solid additives like calcium carbonate, alumina trihydrate, barium sulfate, calcium sulfate, carbon blacks, glass microspheres, micro fibers, magnetic fillers, silica sand and the like; coloring agents such as pigment dyes and chromophores can be added to the compositions, like chromic oxides, ferric oxides, mixtures thereof and the like. Liquid fillers, like certain melamines, may also be employed.

The ratio of plasticizer to DBNG should be within the range of 75/25 to 25/75, and preferably in the range of 50/50 to 65/35, and the amount of this flame retardant blend should constitute at least about 20% by weight of the combined weight of the reactants and liquid modifier, although as demonstrated by the following examples, the amount necessary to provide adequate flame retardancy varies somewhat with the particular reactant system.

Further strengthening of flame retardancy by char formation can be accomplished by optionally employing a drying agent of the zeolite type, specifically molecular sieves. Although molecular sieves are not flame retardants per se, they act as intumescent agents by interrupting the flow of liquid polymer away from the fire via adsorption. Molecular sieves are not useful without the addition of flame retardants. An important industrial application of zeolites is for drying catalytic reactor feed gases; other commercial uses are in protecting foods, electrical equipment and delicate metal parts against moisture. The usage of molecular sieves as moisture scavengers in certain urethane applications is well documented. Molecular sieves are complex synthetic crystalline silicates containing aluminum and one or more other metallic elements: usually sodium, potassium or calcium. Zeolites are tetrahedral framework structures enclosing cavities occupied by large ions and water molecules, both of which have considerable freedom of movement, permitting ion exchange and reversible dehydration. The amount of the molecular sieves used is preferably at least about 0.6% by weight of the combined weight of the reactants and liquid modifier.

Most, but not all, of the flame retardant microcellular polyurethanes of the present invention were prepared in hand mixes. Chemical ingredients were kept at about 29° C. The components were weighed, poured together and stirred vigorously with an air mixer for about 10 seconds. The mixture was then poured into a mold at a mold temperature of about 93° C. The onset of gelation occurred after about 25 seconds of pour, and the reaction was completed after about 60 seconds, producing a solid part. The mold was cured in an air-circulated oven at about 93° C., and the part was removed from the mold within about 5 minutes. The molded compositions were post cured at elevated temperatures for a short period of time and then allowed to cool down to ambient conditions prior to the fire testing, which was done according to UL 94 standards.

The mode of compounding the compositions involves the addition of NCO terminated prepolymer to polyol in the presence of a small amount of an organotin catalyst. The flame retardant blend with and without a char forming agent is added as a separate component prior to polymerization or preblended with the polyol prior to polymerization. The flame retardant blend can be a solution or a dispersion. Incorporating the blend in the form of a solution is preferred. The flame retardant mixture can also become part of the polyisocyanate prepolymer make-up by a complete or partial substitution of the reactive dibromoneopentyl glycol for the hydroxyl initiated polyol or polyol blends.

EXAMPLES

The following examples illustrate ways in which the principle of the invention has been applied, but are not construed as limiting its scope. Where trade names or trademarks are used to denote a particular compound of the formulation, those components may be identified from this list:

ANTIBLAZE 19 is a cyclic phosphonate ester with a high phosphorous content sold by Mobil Chemical Company ANTIBLAZE 78 is a chlorinated phosphonate ester sold by Mobil Chemical Company ANTIBLAZE 80 is a chlorinated phosphate ester sold by Mobil Chemical Company CHEMPOL 31-0044 is an organotin catalyst distributed by Freeman Chemical Corporation CHEMPOL 35-0300 is a 250 molecular weight polyether triol with a hydroxyl number of about 650 and distributed by Freeman Chemical Corporation CHEMPOL 35-0400 is the reaction product of toluene diisocyanate with polyol and an ester diluent forming a prepolymer with a free NCO content of about 18.3% and manufactured by Freeman Chemical Corporation CHEMPOL 35-0500 is a blend of a low molecular weight polyether polyol with a non-reactive dilution and a hydroxyl number of about 550. The product is manufactured by Freeman Chemical Corporation CHEMPOL 35-0600 is a blend of a polymeric isocyanate with a non-reactive diluent and a free NCO content of about 24.2% manufactured by Freeman Chemical Corporation CYMEL 303 is a hexa(methoxymethyl)melamine sold by American Cyanamid Company DBNG is a dibromoneopentyl glycol. FR 1138, sold by Dow Chemical Company, is a commercially available dibromoneopentyl glycol.

MOLECULAR SIEVE, Type 3A, is a potassium alumino-silicate adsorbent sold by the Linde Division of Union Carbide Corporation MOLECULAR SIEVE, Type 4A, is a sodium alumino-silicate adsorbent sold by the Linde Division of Union Carbide Corporation MOLECULAR SIEVE, Type 5A, is a calcium alumino-silicate adsorbent sold by the Linde Division of Union Carbide Corporation MOLECULAR SIEVE, Type 13X, is a sodium alumino-silicate adsorbent sold by the Linde Division of Union Carbide Corporation THERMOLIN 101 is a chlorinated phosphate ester sold by Olin Chemical Corporation T-9 is a stannous octoate catalyst sold by M & T Chemicals PBO 100 is a low molecular weight polyether triol with a hydroxyl number of about 650 and distributed by Poly Blends, Inc.

PXO 100 is the reaction product of an organic diisocyanate with polyol and an ester diluent forming a prepolymer with a free NCO content of about 18.3% and manufactured by Poly Blends, Inc.

80/20 TDI is a toluene diisocyanate containing about 80 percent of 2,4-toluene diisocyanate and about 20 percent 2,6-toluene diisocyanate, available from Mobay Chemical Company and Rubicon Chemicals VORANOL 2025 is a 250 molecular weight triol sold by Dow Chemical Company Some terminology used in the examples is the NCO-/OH ratio: a 100 ratio indicates a stoichiometrical balance between the available isocyanate groups and the available hydroxyl groups. An NCO/OH ratio of 95 indicates that there is a 5% shortage of isocyanate while a ratio of 105 indicates a 5% surplus of isocyanate.

Mechanical-dispensing devices can be employed by utilizing two or more streams of the individual components or mixtures of the components which are introduced into the device.

The following ISP-100 type formulation was utilized to show the effect of adding a 75/25 flame retardant (FR) plasticizer/DBNG mixture of varied concentration with and without molecular sieves on the fire retardancy properties of the final product.

EXAMPLE 1

| Reactants | Concentration (parts by weight) |
|---|---|
| CHEMPOL 35-0400 | 270 |
| CHEMPOL 35-300 | 100 |
| CHEMPOL 31-0044 | 1.39 |
| 75/25 FR PLASTICIZER/DBNG | 37 and 74 |
| MOLECULAR SIEVE #4A | 0–4.6 |
| NCO/OH RATIO | about 90 |

The reactants in the above concentrations were mixed in a conventional manner with conditions well known to those skilled in the art. The resulting FR plasticizer/DBNG mixtures were added in the form of a solution. The molecular sieves were kept in solution with the flame retardant blend by rapidly mixing the components prior to compounding. Samples from the compositions were evaluated, and the results appear below.

TABLE 1

| EXPERIMENT | 1 | 2 | 3 | 4 | 5 | 6 |
|---|---|---|---|---|---|---|
| THERMOLIN 101/DBNG | 74(20%) | 74(20%) | 74(20%) | 37(10%) | | |
| ANTIBLAZE 80/DBNG | | | | | 74(20%) | 74(20%) |
| MOLECULAR SIEVES | | 4.6(1.2%) | 2.3(0.6%) | 4.6(1.2%) | | 4.6(1.2%) |
| Density, pcf. | 69.00 | 71.00 | 68.00 | 65.50 | 67.50 | 72.00 |
| UL 94, set #A, rating | 94 V-1 | 94 V-0 | 94 V-0 | none | 94 V-1 | 94 V-0 |
| UL 94, set #B, rating | 94 V-1 | 94 V-0 | 94 V-0 | none | 94 V-1 | 94 V-0 |

The results shown in Table 1 demonstrate that a 20% concentration of the plasticizer/DBNG blend is sufficient in this system to obtain a 94 V-0 rating when used with a molecular sieve.

EXAMPLE 2

This example was performed using a series of microcellular polyurethanes and PXO-100 and PBO-100 ISP products for the purpose of adding sufficient flame retardant to the system to achieve a UL 94 V-0 rating. The following blend was prepared:

| Reactants | Concentration (Parts by weight) |
|---|---|
| PXO-100 | 268 |
| PBO-100 | 100 |
| T-9 TIN CATALYST | 0.07 |
| 65/35 THERMOLIN 101/DBNG | 66–110 |
| CARBON BLACK | 0–0.18 |
| NCO/OH RATIO | about 80 to about 87 |

TABLE 2

| EXPERIMENT | 7 | 8 | 9 | 10 | 11 | 12 |
|---|---|---|---|---|---|---|
| THERMOLIN 101/DBNG | 74(20%) | 77(25%) | 110(30%) | 66(18%) | 77(25%) | 110(30%) |
| CARBON BLACK | 0 | 0 | 0 | 0 | 0.18 | 0.18 |
| Density, pcf. | 68.07 | 70.93 | 68.96 | 68.65 | 70.12 | 70.04 |
| UL 94, set #A, rating | 94 V-2 | 94 V-0 | 94 V-0 | 94 V-2 | 94 V-0 | 94 V-0 |
| UL 94, set #B, rating | 94 V-1 | 94 V-0 | 94 V-0 | 94 V-2 | 94 V-0 | 94 V-0 |

A 25% flame retardant blend based on the combined weight of prepolymer and polyol was required to achieve a UL 94 V-0 rating. The 20% FR addition exceeded the 50 second combustion time for the desired V-0 rating. In addition the initial set of samples ignited the cottom below in the fire test.

EXAMPLE 3

A 30 percent DBNG solution in flame retardant plasticizer was evaluated to show the effects of a high concentration of flame retardant on physical properties as well as on fire retardancy in the following example:

| Reactants | Concentration (Parts by weight) |
|---|---|
| CHEMPOL 35-0400 | 270 and 312 |
| CHEMPOL 35-0300 | 100 |
| T-9 TIN CATALYST | 0–0.1 |
| CHEMPOL 31-0044 | 0–1.35 |
| 70/30 FR PLASTICIZER/DBNG | 74 and 82 |
| CYMEL 303 | 0–4.59 |
| NCO/OH RATIO | about 88 to about 100 |

The reactants in the above concentration were mixed in a conventional manner. The reaction conditions were conventional and well known to those skilled in the art. The compositions were prepared in hand mixes and machine pours.

TABLE 3

| EXPERIMENT | 13 | 14 | 15 | Machine Run #1 | Machine Run #2 |
|---|---|---|---|---|---|
| CHEMPOL 35-0400 | 312 | 312 | 312 | 270 | 270 |
| THERMOLIN 101/DBNG | 82(20%) | | | 74(20%) | 74(20%) |
| ANTIBLAZE 80/DBNG | | 82(20%) | | | |
| ANTIBLAZE 19/DGNG | | | 82(20%) | | |
| T-9 TIN CATALYST | 0.1 | 0.1 | 0.1 | | |
| CHEMPOL 31-0044 | | | | 1.35 | 1.35 |
| CYMEL 303 | | | | 4.59 | |
| Density, pcf. | 64.80 | 65.30 | 69.90 | 65.81 | 62.46 |
| Tensile strength, p.s.i. | 8560 | 7368 | 8347 | 5880 | 6320 |
| Percent Elongation | 11.4 | 9.0 | 10.0 | 7.0 | 6.9 |
| Tensile modulus, $\times 10^5$ p.s.i. | 1.65 | 1.36 | 1.62 | 1.38 | 1.42 |
| UL 94, set #A, rating | 94 V-0 | 94 V-0 | 94 V-0 | 94 V-0 | 94 V-0 |
| UL 94, set #B, rating | 94 V-0 | 94 V-0 | 94 V-0 | 94 V-0 | 94 V-0 |

The ISP-100 type microcellular polyurethane two-component system was evaluated in conjunction with the 70/30 Thermolin 101/DBNG blend on a modified Admiral P-120 molding machine with a mixing capacity of 8.37 lbs./min. and a mixing RPM of about 3000.

The results of Table 3 demonstrate that in that particular system a concentration of the plasticizer/DBNG of 20% was sufficient to provide a 94 V-0 rating in each instance.

EXAMPLE 4

The percent DBNG in the flame retardant plasticizer solutions was increased step by step from 35% to 70% in this series of compositions. The amount of flame retardant varied from about 15% to about 20% based on the combined weight of prepolymer and polyol.

| Reactants | Concentration (Parts by weight) |
|---|---|
| CHEMPOL 35-0400 | 301–387 |
| CHEMPOL 35-0300 | 100 |
| T-9 TIN CATALYST | 0.9–0.12 |
| 70/30 and 30/70 FR PLASTICIZER/DBNG | 60–97 |
| NCO/OH RATIO | about 95 to about 105 |

TABLE 4

| EXPERIMENT | 16 | 17 | 18 | 19 | 20 | 21 |
|---|---|---|---|---|---|---|
| CHEMPOL 35-0400 | 347 | 387 | 301 | 307 | 302 | 338 |
| 50/50 ANTIBLAZE 80/DBNG | 89(20%) | | | | | |
| 30/70 ANTIBLAZE 80/DBNG | | 97(20%) | | | | |
| 70/30 ANTIBLAZE 80/DBNG | | | 60(15%) | 71(18%) | | |
| 65/35 ANTIBLAZE 80/DBNG | | | | | 79(20%) | 85(19%) |
| Density, pcf. | 67.10 | 67.35 | 58.80 | 59.50 | 64.75 | 70.25 |

TABLE 4-continued

| EXPERIMENT | 16 | 17 | 18 | 19 | 20 | 21 |
|---|---|---|---|---|---|---|
| Tensile strength, p.s.i. | 3680 | | | | 7733 | |
| Percent Elongation | 6.8 | | | | 9.5 | |
| Tensile modulus, $\times 10^5$ p.s.i. | 0.88 | | | | 1.66 | |
| UL 94, set #A, rating | 94 V-0 | 94 V-0 | 94 V-2 | 94 V-1 | 94 V-0 | 94 V-0 |
| UL 94, set #B, rating | 94 V-0 | 94 V-0 | 94 V-2 | 94 V-1 | 94 V-0 | 94 V-0 |

The flame retardant mixture was included in the form of a heated solution at a ratio of about 30 percent to about 70 percent DBNG per FR plasticizer.

The results of Table 4 establish that in that system a concentration of the plasticizer/DBNG blend in the amount of 20%, and in one case 19%, obtained a 94 V-0 rating, whereas a concentration of 18% provided a 94 V-1 rating and a concentration of only 15% produced an unsatisfactory 94 V-2 rating.

EXAMPLE 5

A series of ISP-270 type polymeric isocyanate/amine polyol compositions were poured in conjunction with a 35 percent DBNG solution in FR plasticizer.

| Reactants | Concentration (Parts by weight) |
|---|---|
| CHEMPOL 35-0600 | 194 |
| CHEMPOL 35-0500 | 100 |
| 65/35 FR PLASTICIZER/DBNG | 53 |
| NCO/OH RATIO | about 100 |

TABLE 5

| EXPERIMENT | 22 | 23 |
|---|---|---|
| ANTIBLAZE 80/DBNG | 53(18%) | |
| THERMOLIN 101/DBNG | | 53(18%) |
| Density, pcf. | 72.30 | 72.50 |
| UL 94, set #A, rating | 94 V-0 | 94 V-0 |
| UL 94, set #B, rating | 94 V-0 | 94 V-0 |

The results of Table 5 establish that an 18% concentration of plasticizer/DBNG blend provided a 94 V-0 rating in that particular system, which it should be noted had a relatively high proportion of DBNG in the blend.

EXAMPLE 6

A 65/35 blend of Thermolin 101/DBNG was reacted with 80/20 toluene diisocyanate to form a 27% free NCO prepolymer prepared in accordance with the well-known methods such as described in CHEMISTRY AND TECHNOLOGY, Part 2: Technology of Polyurethanes by Saunders and Frisch, Interscience, 1964. A portion of the 27% free NCO prepolymer was blended with a nonreactive diluent, namely dioctyl phthalate to reduce the free NCO content to about 18%. These two prepolymers were evaluated and compared against a set of 32% free NCO prepolymers, which were prepared according to U.S. Pat. No. 3,726,827 using DOP as the heat sink versus an organophosphorus compound, namely Thermolin 101. The prepolymers, in turn, were reacted with Voranol 2025 polyether polyol in the presence of an organotin catalyst to produce microcellular polyurethane compositions. Prepolymer A consisted of TDI and FR plasticizer/DBNG blend, Prepolymer B was the same as A with an addition of ester diluent, Prepolymer C contained TDI and DOP, and Prepolymer D contained TDI and Thermolin 101 (no DBNG). The NCO/OH ratio was kept at about 100.

TABLE 6

| EXPERIMENT | 24 | 25 | 26 | 27 |
|---|---|---|---|---|
| PREPOLYMER B | 270 | | | |
| PREPOLYMER C | | 270 | | |
| PREPOLYMER D | | | 270 | |
| PREPOLYMER A | | | | 179 |
| VORANOL 2025 | 100 | 100 | 100 | 100 |
| T-9 TIN CATALYST | 0.09 | 0.09 | 0.09 | 0.07 |
| Density, pcf. | 71.00 | 71.50 | 72.00 | 57.80 |
| UL 94, set #A, rating | 94 V-0 | none | none | 94 V-0 |
| UL 94, set #B, rating | 94 V-0 | none | none | 94 V-0 |

The compositions were poured according to conditions well-known to those skilled in the art. The appearance of the molded products was satisfactory with no evidence of incompatability problems. The amount of the FR plasticizer/DBNG blend in the final part composition was as follows: Experiment 24 about 21%, Experiment 25 no flame retardant (control sample), Experiment 26 about 47%, and Experiment 27 about 30%. Sample 26 contained Thermolin 101 in its polymer composition, but despite the high amount of flame retardant, the sample failed the UL 94 fire test due to a flaming combustion time exceeding 250 seconds accompanied by burn-melt drippings exposing constantly new polymer surface to the fire. The synergistic mechanism of the organophosphorus flame retardant/DBNG blend is demonstrated by Experiments 24 and 27 in which a UL 94 V-0 rating was achieved due to quick supression of ignition/combustion at the site of ignition after either application of the test flame. In Experiment 27 the FR plasticizer served as the heat sink, replacing DOP. In Experiment 24, DOP was included as the heat sink with a lesser amount of FR plasticizer.

The following example was conducted to demonstrate that it is possible to obtain satisfactory flame retardancy using molecular sieves with a flame retardant plasticizer in accordance with the present invention, but without using a polybrominated polyol. The plasticizer used was a phosphate ester. In this example it was necessary to either constantly agitate the blend at a low speed or vigorously mix the blend prior to reaction with the prepolymer.

EXAMPLE 7

| Reactants | Concentration (Parts by weight) |
|---|---|
| CHEMPOL 35-0400 | 270 |
| CHEMPOL 35-0300 | 100 |

-continued

| Reactants | Concentration (Parts by weight) |
|---|---|
| CHEMPOL 31-0041 | 1.39 |
| FR PLASTICIZER | 74 |
| MOLECULAR SIEVES | 2.3 and 4.6 |
| NCO/OH RATIO | about 100 |

TABLE 7

| EXPERIMENT | 28 | 29 | 30 |
|---|---|---|---|
| THERMOLIN 101 | 74 | 74 | 74 |
| MOLECULAR SIEVES, #4A | 4.6(1.2%) | | |
| MOLECULAR SIEVES, #3A | | 4.6(1.2%) | |
| MOLECULAR SIEVES, #13X | | | 2.3(0.6%) |
| Density, pcf. | 61.50 | 62.05 | 60.50 |
| Tensile strength, p.s.i. | 5720 | | |
| Percent Elongation | 7.4 | | |
| Tensile modulus, $\times 10^5$ p.s.i. | 1.47 | | |
| UL 94, set #A, rating | 94 V-0 | 94 V-1 | 94 V-0 |
| UL 94, set #B, rating | 94 V-0 | 94 V-0 | 94 V-0 |

The results shown in Table 7 demonstrate that, with sufficient concentrations, molecular sieves can provide a 94 V-0 rating without requiring the combination with a polybrominated polyol.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

What is claimed is:

1. A non-burning, non-dripping instant set microcellular polyurethane comprising a polyisocyanate or polyisocyanate prepolymer reacted with a low molecular weight polyether polyol that has been blended with a non-reactive liquid modifier, and a flame retardant blend of an organophosphorus plasticizer and a polybrominated polyol in a sufficient quantity to provide desired flame retardancy in said polyurethane.

2. A non-burning, non-dripping instant set microcellular polyurethane according to claim 1 and characterized further in that said organophosphorus plasticizer comprises a halogenated phosphate ester or a halogenated phosphonate ester.

3. A non-burning, non-dripping instant set microcellular polyurethane according to claim 1 and characterized further in that said organophosphorus plasticizer is selected from the group consisting of tris(2,3-dibromopropyl)phosphate, tris(2,3-dichloroproply)phosphate, dimethyl methylphosphonate, tris($\beta$-chloropropyl)phosphate, tris($\beta$-chloroethyl)phosphate, tetrakis(2-chloroethyl)ethylene disphosphate, triethyl phosphate, tricresyl phosphate, diethyl[bis(2-hydroxyethyl)amino]methane phosphonate, diethyl methylphosphonate, diol-phosphonates and mixtures thereof.

4. A non-burning, non-dripping instant set microcellular polyurethane according to claim 1 and characterized further in that said polybrominated polyol is dibromoneopentyl glycol or an ester of dibromoneopentyl glycol.

5. A non-burning, non-dripping instant set microcellular polyurethane according to claim 1 and characterized further in that the weight ratio of said plasticizer to said polybrominated polyol is in the range of 75/25 to 25/75.

6. A non-burning, non-dripping instant set microcellular polyurethane according to claim 1 and characterized further in that the weight ratio of said plasticizer to said polybrominated polyol is in the range of 65/35 to 50/50.

7. A non-burning, non-dripping instant set microcellular polyurethane according to claim 1 and characterized further in that said flame retardant blend is in an amount of at least about 20% by weight of the combined weight of the reactants and liquid modifier.

8. A non-burning, non-dripping instant set microcellular polyurethane according to claim 1 and characterized further in that said organophosphorus plasticizer is selected from the group consisting of tris(2,3-dibromopropyl)phosphate, tris(2,3-dichloropropyl)phosphate, dimethyl methylphosphonate, tris($\beta$-chloropropyl)phosphate, tris($\beta$-chloroethyl)phosphate, tetrakis(2-chloroethyl)ethylene diphosphate, triethyl phosphate, tricresyl phosphate, diethyl[bis(2-hydroxyethyl)amino]methane phosphonate, diethyl methylphosphonate, diol-phosphonates and mixtures thereof, and in that the weight ratio of said plasticizer to said polybrominated polyol is in the range of 75/25 to 25/75.

9. A non-burning, non-dripping instant set microcellular polyurethane according to claim 1 and characterized further in that said organophosphorus plasticizer is selected from the group consisting of tris(2,3-dibromopropyl)phosphate, tris(2,3-dichloropropyl)phosphate, dimethyl methylphosphonate, tris($\beta$-chloropropyl)phosphate, tris($\beta$-chloroethyl)phosphate, tetrakis(2-chloroethyl)ethylene diphosphate, triethyl phosphate, tricresyl phosphate, diethyl[bis(2-hydroxyethyl)amino]methane phosphonate, diethyl methylphosphonate, diol-phosphonates and mixtures thereof, and in that said flame retardant blend is in an amount of at least about 20% by weight of the combined weight of the reactants and liquid modifier.

10. A non-burning, non-dripping instant set microcellular polyurethane according to claim 1 and characterized further in that said polybrominated polyol is dibromoneopentyl glycol, and in that said flame retardant blend is in an amount of at least about 20% by weight of the combined weight of the reactants and liquid modifier.

11. A non-burning, non-dripping instant set microcellular polyurethane comprising a polyisocyanate or polyisocyanate prepolymer reacted with a low molecular weight polyether polyol that has been blended with a non-reactive liquid modifier, and a flame retardant blend of an organophosphorus plasticizer and a polybrominated polyol in a sufficient quantity to provide desired flame retardancy in said polyurethane and characterized further by a minor amount of an adsorbent molecular sieve made from natural or synthetic crystalline alkali-metal alumino-silicates of the zeolite type, which is added in a sufficient quantity to impart effective char formation in said polyurethane.

12. A non-burning, non-dripping instant set microcellular polyurethane according to claim 11 and characterized further in that said absorbent molecular sieve is in an amount of at least about 0.6% by weight of the combined weight of the reactants and liquid modifier.

13. A non-burning, non-dripping instant set microcellular polyurethane comprising a polyisocyanate or polyisocyanate prepolymer reacted with a low molecular weight polyether polyol that has been blended with a non-reactive liquid modifier, a flame retardant organophosphorus plasticizer, and a minor amount of an adsorbent molecular sieve made from natural or synthetic crystalline alkali-metal alumino-silicates of the zeolite type.

14. A non-burning, non-dripping instant set microcellular polyurethane according to claim 13 and characterized further in that said adsorbent molecular sieve is in an amount of at least about 0.6% by weight of the combined weight of the reactants and liquid modifier.

15. A non-burning, non-dripping instant set microcellular polyurethane according to claim 13 and characterized further in that said organophosphorus plasticizer comprises a halogenated phosphate ester or a halogenated phosphonate ester.

16. A non-burning, non-dripping instant set microcellular polyurethane according to claim 15 and characterized further in that said adsorbent molecular sieve is in an amount of at least about 0.6% by weight of the combined weight of the reactants and liquid modifier.

17. A non-burning, non-dripping instant set microcellular polyurethane according to claim 13 and characterized further in that said organophosphorus plasticizer is selected from the group consisting of tris(2,3-dibromopropyl)phosphate, tris(2,3-dichloropropyl)phosphate, dimethyl methylphosphonate, tris($\beta$-chloropropyl)phosphate, tris($\beta$-chloroethyl)phosphate, tetrakis(2-chloroethyl)ethylene diphosphate, triethyl phosphate, tricresyl phosphate, diethyl[bis(2-hydroxyethyl)amino]methane phosphonate, diethyl methylphosphonate, diol-phosphonates and mixtures thereof.

18. A non-burning, non-dripping instant set microcellular polyurethane according to claim 17 and characterized further in that said adsorbent molecular sieve is in an amount of at least about 0.6% by weight of the combined weight of the reactants and liquid modifier.

* * * * *